United States Patent [19]

Kawakami

[11] 4,410,939
[45] Oct. 18, 1983

[54] SYSTEM FOR PROGRAM INTERRUPT PROCESSING WITH QUASI-STACK OF REGISTER-SETS

[75] Inventor: Katsura Kawakami, Yokohama, Japan

[73] Assignee: Matsushita Electric Industrial Co. Ltd., Osaka, Japan

[21] Appl. No.: 169,475

[22] Filed: Jul. 16, 1980

[30] Foreign Application Priority Data

Jul. 17, 1979 [JP] Japan .................................. 54-90597

[51] Int. Cl.³ .......................... G06F 9/06; G06F 9/40; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,348,211 | 10/1967 | Ghiron | 364/200 |
| 3,659,272 | 4/1972 | Price et al. | 364/200 |
| 3,725,868 | 4/1973 | Malmer, Jr. et al. | 364/200 |
| 3,974,480 | 8/1976 | Gernelle | 364/200 |
| 4,171,537 | 10/1979 | Weissberger et al. | 364/704 |
| 4,217,638 | 8/1980 | Namimoto et al. | 364/200 |
| 4,228,500 | 10/1980 | Webster | 364/200 |
| 4,237,535 | 12/1980 | Wiedenman | 364/200 |
| 4,338,662 | 7/1982 | Yokoyama | 364/200 |
| 4,348,721 | 9/1982 | Brereton et al. | 364/200 |

*Primary Examiner*—James D. Thomas
*Assistant Examiner*—Archie E. Williams
*Attorney, Agent, or Firm*—Lowe, King, Price & Becker

[57] ABSTRACT

A plurality of registers included in a central processing unit are electrically divided into a plurality of register-sets which are arranged in a given order to be used as a stack where one of the register-sets at the top of stack is normally used for executing the program of a main routine. In one embodiment, the data of the register-sets are pushed down for executing interrupt service routines and then popped up for resuming the suspended program. When all of the register-sets are loaded, the data may be saved in a saving region of a main memory, and the saved data may be directly transferred to the top register-set when needed. In another embodiment, actual push down and popping up of data are not performed but one of the register-sets is selectively enabled so that the register-sets function as a stack.

2 Claims, 8 Drawing Figures

|  | 0 0 | 1 1 | 0 1 | 1 0 |
|---|---|---|---|---|
| 1st REGISTER-SET | A | B | A | UNUSED |
| 2nd REGISTER-SET | UNUSED | A | B | A |

SYSTEM FOR PROGRAM INTERRUPT PROCESSING WITH QUASI-STACK OF REGISTER-SETS

FIELD OF THE INVENTION

This invention generally relates to a method and apparatus for program interrupt processing in a computer. More particularly, the present invention relates to a method of interrupt processing in which an interrupt processing can be performed within a short period of time.

BACKGROUND OF THE INVENTION

When actualizing a central processing unit, which will be referred to as a CPU hereinafter, on a large-scale integrated circuit, it is preferable that the system of the central processing unit comprise many elements having a regular structure, such as those of general-purpose registers, read only memory or the like, since elements having irregular logical structure, such as arithmetic-logic units, instruction decoders or the like are relatively large in scale. Elements having regular structure on the other hand have small wiring areas so that a high-density circuit arrangement can be adopted. Generally speaking, general-purpose registers in a CPU are capable of performing high-speed access compared to a main storage device so that it is possible to execute high-speed processing such as the operation of complex data of a large number, by building in a number of general-purpose registers. However, when an interrupt request is applied to the CPU, it is often necessary to save the data stored in the general-purpose registers in the main memory prior to the execution of the interrupt service routine. Therefore, if the number of the general-purpose registers is great, the number of times that data are transferred from the registers to the CPU is also great, so that it takes a relatively long period of time from the time of application of the interrupt request until the initialization of the interrupt service routine. In the same manner, it takes a relatively long period of time when returning to the original program from the interrupt service routine. Accordingly, in case there are a number of interrupt priority levels, and the program is such that a number of input/output devices are controlled, the processing of the interrupt service routines will be delayed if interrupt requests are frequently applied while the number of the registers used therefor is great.

Figure 1:
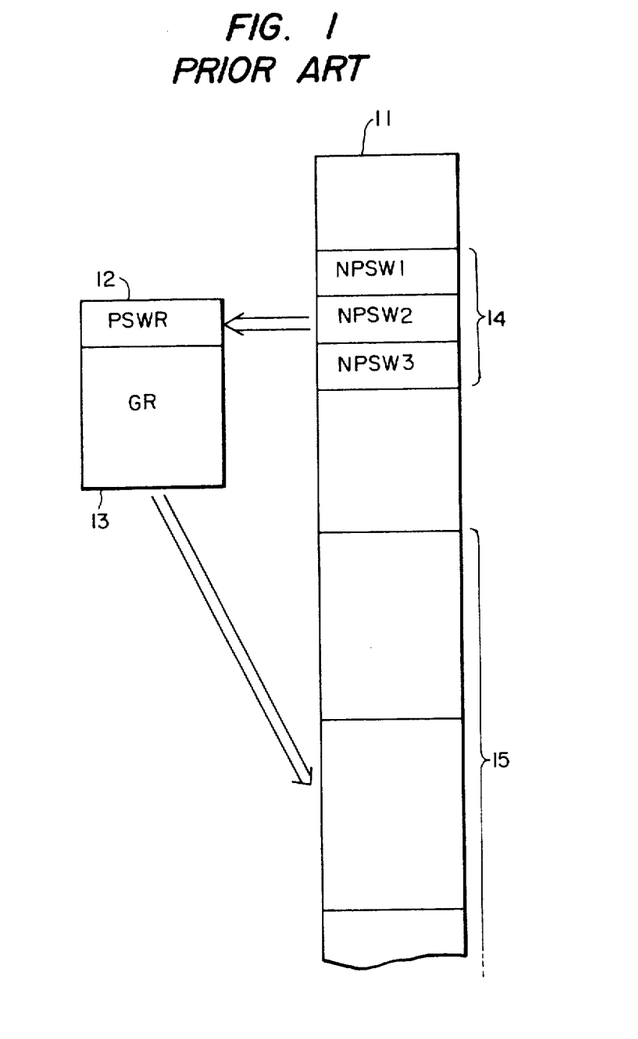
FIG. 1 is a schematic diagram useful for understanding a conventional method.

For a better understanding of the present invention a conventional and most typical method of interrupt processing will be described with reference to FIG. 1. In FIG. 1, a reference numeral 11 represents a main memory or storage device, 12 a register (PSWR) which stores or holds a program status word (PSW). A PSW includes various information indicative of the state of a running program, such as the count of the program counter (not shown), the content of the arithmetic status register (not shown) and the like. A reference numeral 13 represents a general-purpose register (GR), and these registers 12 and 13 are included in a central processing unit CPU. An initial value of the program status word register PSWR for initializing the execution of the interrupt service routine, i.e. a new program status word (NPSWR) is prestored in a particular region 14 of the main memory 11. A region designated at a reference 15 in the main memory 11 is used for saving the data of the PSWR 12 and the general-purpose register 13 on execution of an interrupt service routine. This region 15 may be referred to as a saving region.

When an interrupt request is acknowledged, the contents of the PSWR 12 and the GR 13 are transferred to respective specific regions corresponding to the interrupt priority levels in the saving region 15, and then an NPSWR corresponding to the interrupt priority level is selected from the region 14 to be transferred to the PSWR and then the execution of the program of the interrupt service routine is started. As the interrupt service routine has been completed, and in case of turning to the execution of the original program, the information or data saved in the saving region 15 are transferred to the PSWR 12 and GR 13 thereby resuming the execution of the original program. As described in the above, in the conventional example of FIG. 1, it is necessary to transfer the contents of the PSWR 12 and GR 13 between the CPU and the main memory 11 at the time of initialization and termination of the interrupt service so that it takes a relatively long period of time to respond to or handle an interrupt service.

Figure 2:
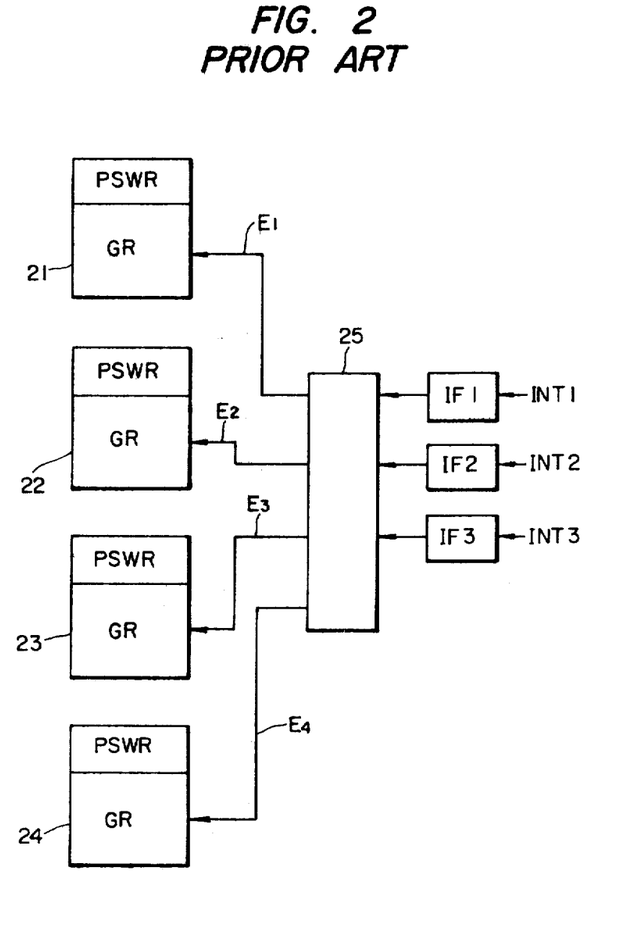
FIG. 2 is a schematic diagram useful for understanding another conventional method in which respective register sets correspond respective interrupt priority levels one to one.

FIG. 2 also illustrates a conventional example, and in this example, a plurality of internal registers of the CPU are divided into several groups or sets in order to improve the response time for interrupt services. Reference numerals 21, 22, 23 and 24 respectively represent first, second, third and fourth register-sets. All of the register-sets have the same construction, and each of the register-sets consists of a PSWR and a general-purpose register GR to assume either an active state or a hold state. References E1, E2, E3 and E4 are signals which determine whether a corresponding register-set is put in the active state or in the hold state. References INT1, INT2 and INT3 represent interrupt request signals, and it is assumed that a smaller number indicates a higher priority level. Flip-flops IF1, IF2 and IF3 are respectively responsive to the above-mentioned interrupt requests, and each of the flip-flops IF1 to IF3 is set when the logic level of its interrupt request signal turns to "1" from "0". A reference numeral 25 represents a priority control circuit which changes the logic level of one signal among the above-mentioned signals E1 to E4 to "1" by checking the highest priority level set in the flip-flops IF1 to IF3. In case all of the flip-flops IF1 to IF3 have been reset, only E4 becomes logic "1". Accordingly, when there is no interrupt request, only the fourth register 24 is in the active state, while other three registers 21 to 23 are in the hold state. Under this condition, it is assumed that an interrupt request of the second level has occurred. Accordingly, the logic level of the signal INT2 becomes "1" to set the second flip-flop IF2. As a result, the output E2 of the priority control circuit 25 turns to logic "1", while the output E4 turns to logic "0". Consequently, the fourth register-set 24 returns to its hold state, while the second register-set 22 turns to its hold state. There is no need to save the contents of the register-sets in the main memory as in the system of FIG. 1 so that the second register-set will be used for the execution of the interrupt service routine program. Furthermore, if initial values NPSW corresponding to respective levels have been prestored in the PSWR of respective register-sets, there is no need to fetch a PSW from the main memory at the time of occurrence of an interrupt request. In case that the interrupt service routine of the second level has been completed, the execution of the original program, which has been suspended, will start by resetting the flip-flop IF2 to cause the logic level of the signal E2 to become "0" again when a return-from-interrupt service routine instruction is executed. Also when an interrupt request of the first level occurs during the execution of the interrupt service routine of the first level, the CPU can respond quickly in the same manner. It will be recognized that in such a system having four registers, prior execution of interrupt service routines can be performed at high-speed with as many as four priority levels.

However, such a system has the following drawbacks.

(1) Since it is necessary to prestore a PSW in each PSWR of respective register-sets by a program, it is difficult to maintain an interchangeability between systems having different numbers of register-sets.

(2) The number of priority interrupt levels cannot be increased more than the number of the register-sets.

SUMMARY OF THE INVENTION

The present invention has been developed in order to remove the above-mentioned drawbacks in actualizing a CPU on a large-scale integrated circuit, and this invention provides a method of removing drawbacks which occur when it is intended to improve the response speed with respect to interrupt requests and to increase the proportion of the section having a regular logic structure of a CPU having a number of general-purpose registers. In accordance with the present invention the registers built in a CPU are electrically divided into a plurality of groups or sets, which are referred to as register-sets hereinafter, to use the register-sets as a first-in, last-out stack.

It is, therefore, a primary object of the present invention to provide a method and apparatus for program interrupt processing with which the response speed of the CPU of a computer with respect to interrupt requests is improved.

Another object of the present invention is to provide a method and apparatus for program interrupt processing in which the number of interrupt priority levels is not restricted by the number of registers or register-sets included in the CPU as long as there are at least two register-sets.

In one embodiment of the present invention, the contents of register sets are pushed down in the stack for executing interrupt service routines, and the contents of the bottom register-set may be saved in a saving region of a main memory if all of the register-sets are loaded. The contents of the register-sets are popped up to resume the execution of the program of interrupt service routine having a priority level lower than that of the interrupt service routine just completed. The data saved in the saving region of the main memory are directly transferred to the top register-set if remaining register-sets are unloaded. In another embodiment of the present invention, a plurality of register-sets do not form a normal stack but a quasi stack since actual transfer or shift of the contents of respective register-sets between the register-sets is not performed. Namely, only one of the register-sets is enabled one after another in a predetermined order in response to interrupt requests. When an interrupt service routine of higher priority level is completed, one of the register-sets is enabled one after another in the reverse order. The contents of one register-set storing the oldest data may be saved in a saving region of the main memory when all of the register-sets are loaded. The saved data may be retrieved in the reverse direction.

BRIEF DESCRIPTION OF THE DRAWINGS

These and other objects and features of the present invention will become more readily apparent from the following detailed description of the preferred embodiment taken in conjunction with the accompanying drawings in which.

DETAILED DESCRIPTION OF THE PREFERRED EMBODIMENTS

Figure 3:
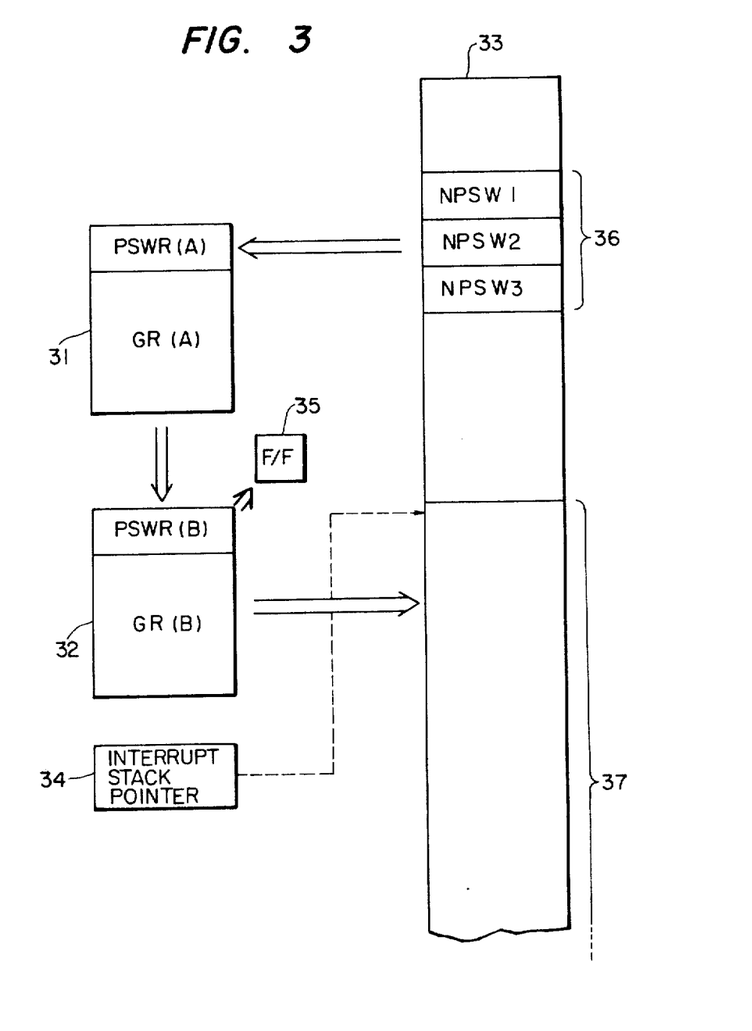
FIG. 3 is a schematic diagram useful for understanding the concept of the method according to the present invention.

Reference is now made to FIG. 3, which is useful for understanding the method according to the present invention. Although the present invention may be adapted irrespectively of the number of the register-sets built in the central processing unit (CPU) of a microprocessor, the description will be made in case of two register-sets for the clarity and simplicity. FIG. 3 illustrates a portion of the CPU and a portion of a main memory. In detail, a reference numeral 31 represents a register-set A; 32 a register-set B; 33 a main memory; and 34 an interrupt stack pointer for holding the address of the saving region of the main memory 33 for the contents of the register-set B 32. A reference numeral 35 represents a flip-flop for indicating the state of the register-set B 32. Each of the register-sets A 31 and B 32 is contructed of a register (PSWR) for storing a program status word (PSW) and general-purpose registers. The register-set A 31 is always in its active state, while the register-set B assumes either a hold state or an unused state unused state. In other words, the register-set A 31 is continuously enabled, and the register-set B 32 is either enabled or disabled. The flip-flop 35 is in a set state when the register-set B is in its hold state, and in a reset state when the same is in its unused state. When no interrupt request is applied, flip-flop 35 is in the reset state and therefore, the register-set B is in the unused state so that the program is executed by using the PSWR and the general-purpose resistors GR(A) of the register-set A 31. A reference numeral 36 represents a region for storing initial values, i.e. new program status words, NPSW1, NPSW2, NPSW3 . . . , of the PSWRs for initializing the execution of respective interrupt service routines, and 37 a saving region for the contents of the register-set B 32.

The systems of FIG. 3 operates as follows:

(1) When an interrupt request has occurred.
(a) Checking the content of the flip-flop 35 to perform the following steps (b), (c) and (d) if the flip-flop 35 has been set, and to perform only the following steps (c) and (d) if the flip-flop 35 has been reset.
(b) Saving the contents of the register set-B 32 in a region starting from an address indicated by the interrupt stack pointer 34, and then increasing the contents of the interrupt stack pointer 34 in correspondence to the number of the words saved.
(c) Transferring all of the contents of the register-set A 31 to the register-set B 32, and setting the flip-flop 35.
(d) Transferring an NPSW corresponding to the interrupt priority level from the main memory 33 to the register-set A 31, and then starting execution of the program of the interrupt service routine.
(2) Upon returning from the interrupt service routine.
(a) Checking the content of the flip-flop 35 to perform the following step (b) if the flip-flop 35 has been set, and to perform the following step (c) if the flip-flop 35 has been reset.
(b) Transferring all of the contents of the register-set B 32 to the register set A 31, and then resetting the flip-flop 35 to resume the execution of the program of the suspended main routine.
(c) Transferring all of the data in the region whose addresses in the saving region 37 of the main memory 33 are smaller than or equal to the address indicated by the interrupt stack pointer 34, to the register-set A 31, and then decreasing the contents of the interrupt stack pointer 34 in correspondence to the number of the words transferred. This transfer of data from the saving region 37 will be referred to as retrieving.

Figure 4:
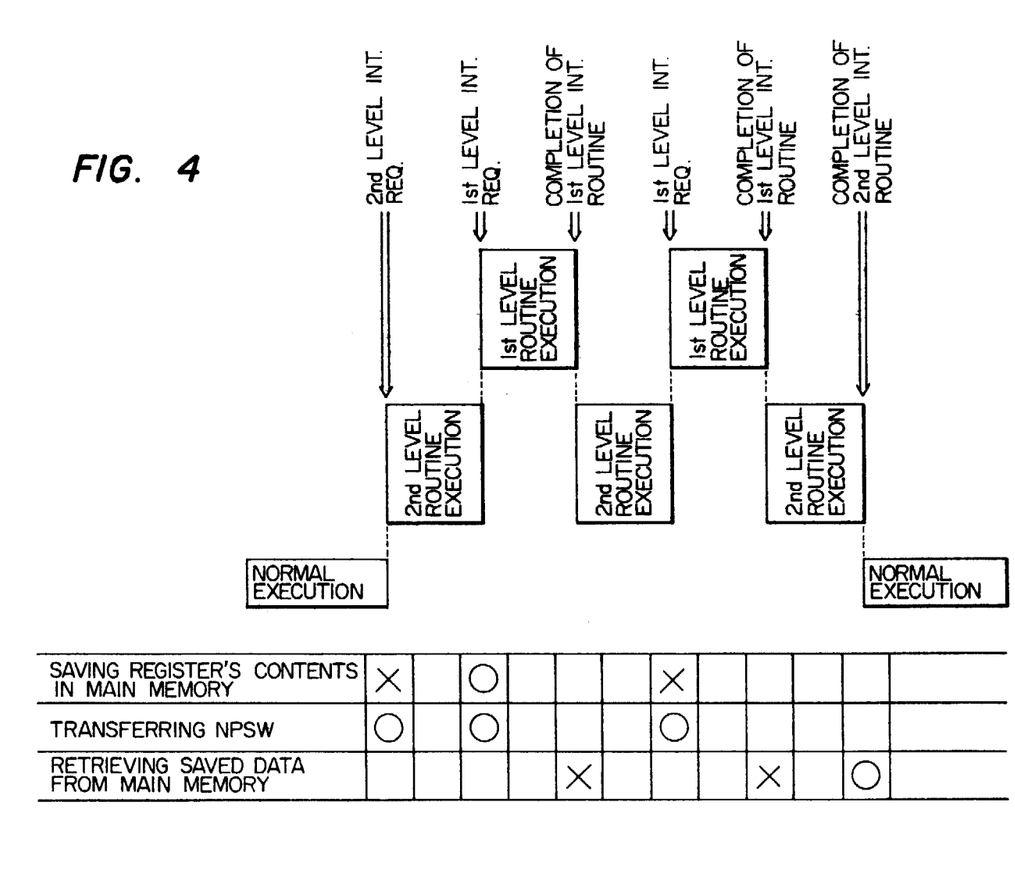
FIG. 4 is a schematic diagram useful for understanding the effects of the method according to the present invention.

The above-steps will be further described imagining the occurrence order of actual interrupt requests with respect to the lapse of time. FIG. 4 illustrates a situation wherein a first level interrupt has occurred twice during the execution of an interrupt service routine of the second level. The system of FIG. 3 will be described with reference to FIG. 4. In case the normal or main program is executed upon receiving no interrupt request, the flip-flop 35 of FIG. 3 is in its reset state. When an interrupt request of the second level has been acknowledged, all of the contents of the register-set A 31 are transferred to the other register-set B 32 since the flip-flop 35 is in its reset state, and then the flip-flop 35 is set. After the above step, a new program status word corresponding to an interrupt service routine of the second level, namely, NPSW2 is transferred to the PSWR of the register set A 31 to start the execution of the interrupt service routine. Nextly, if an interrupt request of the first level occurs, the contents of the register-set B 32 are saved in the main memory 33 since the flip-flop 35 is in its set state, increasing the contents of the interrupt stack pointer 34; transferring the contents of the register-set A 31 to the register-set B 32; transferring the NPSW1 from the main memory 33 to the PSWR of the register-set A 31; so that the execution of the interrupt service routine of the first level starts. This means that the contents of the PSWR and GR of the register-set A 31 before the interrupt are transferred to the main memory 33, while the intermediate results of the interrupt service of the second level are held in the register set B 32. After the completion of the interrupt service routine of the first level, the content of the flip-flop 35 is checked upon application of a return-from-interrupt service routine instruction. Since the flip-flop 35 is in its set state, the contents of the register-set B are all transferred to the register-set A 31, resetting the flip-flop 35, and thus the register-set B 32 turns to its unused state to resume the execution of the program. This means that the execution of the suspended interrupt service routine of the second level has started again.

Let us further assume that another interrupt request of the first level has occurred under this condition. Since the flip-flop 35 is in its reset state, the contents of the register-set A 31 are transferred to the register-set B 32 suspending the execution of the interrupt service routine of the second level. The flip-flop 35 is then set, transferring the NPSW1 to the PSWR of the register-set A 31, and starting the execution of the interrupt service routine of the first level. After the completion of the first level interrupt service routine, the contents of the register-set B 32 are transferred to the register-set A 31 since the flip-flop 35 is in its set state, and then the flip-flop 35 is reset to continue the execution of the interrupt service routine of the second level. After the completion of the second level interrupt service routine, the address indicated by the interrupt stack pointer 34 regains the former one, retrieving the saved data by transferring the same from the main memory 33 to the register-set A 31 to resume the original program. Namely, the CPU resumes the execution of the suspended program at the point of interruption so that the program of the main routine which had been executed before the application of the interrupts requests is now continuously executed.

From the above it will be understood that in accordance with the present invention there is no limit with respect to the number of interrupt priority levels, and therefore, the number of the possible priority levels is not restricted by the number of the register sets as in the conventional system of FIG. 2.

The lower part of FIG. 4 is a table showing the difference in operation between the conventional method and the method according to the present invention. In this table, a circular symbol indicates that the operation of the column is performed in both methods, while a symbol X indicates that the operation of the column is performed by transferring data between the CPU and the main memory in the conventional method, and on the other hand, according to the present invention the same operation can be achieved by simply transferring the data between the register-sets included in the CPU. From the table of FIG. 4 it will be recognized that the number of times of transfer of the data between the CPU and the main memory has been remarkably reduced in accordance with the present invention.

Figure 5:
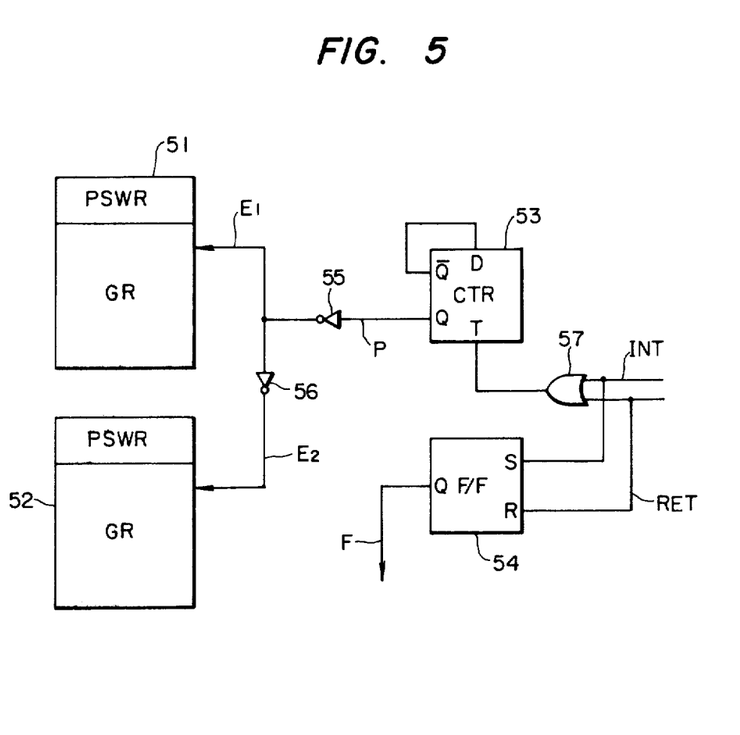
FIG. 5 is a schematic diagram of a control circuit for actualizing the method according to the present invention.

Although in the above first embodiment, it has been described that the data are transferred between register-sets A 31 and B 32, an actual transfer of the data will not be required if a system of FIG. 5 is employed. Namely, as shown in FIG. 5 two register-sets 51 and 52 are employed in place of the register sets A 31 and B 32 of FIG. 4, and both register-sets 51 and 52 are arranged to alternately correspond to each of the register-sets A 31 and B 32. With this provision, when it is necessary to transfer data between the register-sets A 31 and B 32, the way of the correspondence may be changed. FIG. 5 is a block diagram of the second embodiment in which the above-described method is actualized. A reference numeral 53 represents a 1-bit binary counter which determines which register-set 51 or 52 to correspond to the register-set A 31 of FIG. 4. In case the output signal P of the binary counter 53 assumes its logic "0", the first register-set 51 corresponds to the register-set A, and on the contrary, in case the same assumes its logic "1" the second register-set 52 corresponds to the register-set A. A reference numeral 54 represents a flip-flop for indicating whether one of the register-sets 51 and 52, which corresponds to the register-set A 31, is in its hold state storing interrupt source data to resume program execution. The set state of the flip-flop 54 indicates the hold state, and the reset state the unused state, and this flip-flop 54 corresponds to the flip-flop 35 of FIG. 3. Upon occurrence of an interrupt request an interrupt request signal INT becomes logic "1", and a signal RET becomes logic "1" when a return-from-interrupt service routine instruction has been executed. An output terminal of the counter 53 is connected to an input terminal of an inverter 55 the output terminal of which is connected to an input terminal of a second inverter 56 and to the first register-set 51. The output terminal of the second inverter 56 is connected to the second register-set 52. Signals P and F respectively represent the output signals of the counter 53 and the flip-flop 54. The output signals of these two inverters 55 and 56 are respectively designated at E1 and E2, and when each of the signals E1 and E2 becomes logic "1", the corresponding register-set 51 or 52 is enabled. An OR gate 57 is provided for receiving the interrupt request signal INT and the signal RET, while these two signals INT and RET are respectively applied to the set and reset terminals S and R of the flip-flop 54. The output terminal of the OR gate 57 is connected to the T input of the binary counter 53.

The operation of the second embodiment of FIG. 5 will be described in connection with the sequence of interrupt requests occurrence of FIG. 4. It is assumed that both of the output signals P and F of the binary counter 54 and the flip-flop 53 are at logic "0" level in the absence of a first interrupt request. Therefore, the first register-set 51 corresponds to the register-set A 31 of FIG. 4 so that the main program is executed by the first register-set 51. Since the signal F is of logic "0", the second register-set 52 is in its unused state. When a second level interrupt request is acknowledged, the signal INT becomes logic "1" causing the binary counter 53 to invert its output and setting the flip-flop 54. As a result, the second register-set 52 now corresponds to the register-set A 31 in place of the first register-set 51. Since the signal E2 becomes logic "1", the second register-set 52 becomes active to store a new program status word NPSW2 in the PSWR of the second register-set 52 so that the execution of interrupt service routine of the second level will be carried out by the second register set 52. At this time the signal F is of logic "1" indicating that the first register-set 51 is in its hold state. Nextly, when a first level interrupt occurs, the CPU recognizes that it is necessary to save the contents of the register-set 51 in the main memory 33 (see FIG. 3) from the facts that the signal INT becomes logic "1" while the signal F is of logic "1". The binary counter 53 thus inverts its output and thus the signal P becomes logic "0". Accordingly, the signal E1 becomes logic "1" enabling the first register-set 51. The contents of the first register-set 51, namely, the intermediate result of the execution of the main routine program which had been executed under the condition of no interrupt request, are transferred to the main memory 33 to be saved, and a new program status word NPSW1 is transferred from the main memory 33 to the PSWR of the first register-set 51 so that the program of the interrupt service routine of the first level is executed by the first register-set 51. In other words, the first register-set 51 is now corresponding to the register-set A 31. The flip-flop 54 is left just as it was set and this fact indicates that the second register-set 52 is in its hold state. After the completion of the first level interrupt service routine and when a return-from-interrupt service routine instruction is executed, the signal RET becomes logic "1" causing the binary counter 53 to invert its output so that the output P becomes logic "1". As a result, the second register-set 52 is enabled to resume the execution of the program of the interrupt service routine of the second level. Since the flip-flop 54 is in its reset state, it indicates that the first register-set 51 is in its unused state. Under this condition, if a first level interrupt request is recognized again, the output signal P of the binary counter 53 becomes logic "0" enabling the first register-set 51 so that the NPSW1 is transferred to the PSWR of the first register-set 51 to start execution of the interrupt service routine of the second level. The flip-flop 54 is then set and the second register-set 52 is put in the hold state. After the completion of the first level interrupt service routine, and when a return instruction is executed, the signal RET becomes logic "1" causing the output signal P of the binary counter 53 to become logic "1" so that the execution of the second level interrupt service routine which has been suspended, starts again. At this time, the flip-flop 54 is reset by the logic "1" of the signal RET. After the completion of the second level interrupt service routine, when a return instruction is executed, the CPU recognizes that it is necessary to retrieve the saved data from the main memory since the signal RET has become logic "1" while the flip-flop 54 is in its reset state. The binary counter 53 inverts its output so that the output signal P becomes logic "0" enabling the first register-set 51 to store the data transferred from the main memory 33 in the first register-set 51. As a result, the first register-set 51 executes the original main routine program which had been executed before interrupt requests were acknowledged. At this time, since the flip-flop 54 is in its reset state so that the second register-set 52 is put in the unused state.

Figure 6:
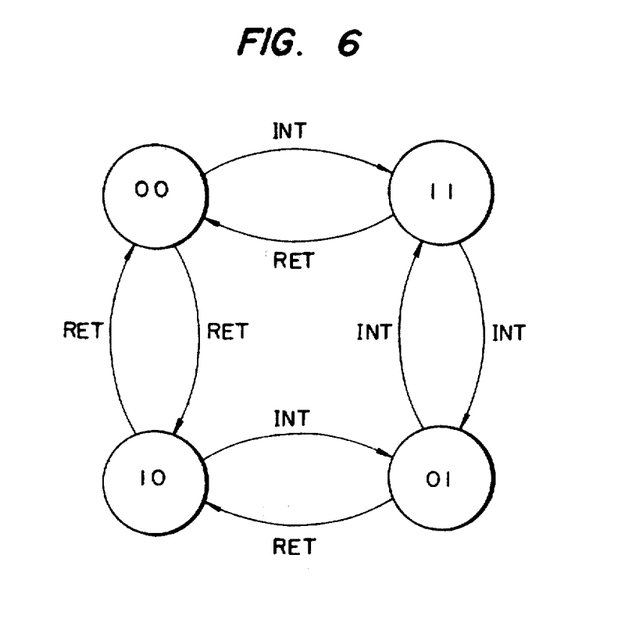
FIG. 6 is a schematic diagram showing the transitional states of the circuit of FIG. 5.

FIG. 6 is a chart showing the transitional states of the binary counter 53 and the flip-flop 54 of FIG. 5. In FIG. 6, numbers of two figures are shown, and an upper digit of each number represents the output logic level of the binary counter 53, while a lower digit of each number represents the output logic level of the flip-flop 54. References INT and RET respectively represent the occurrence of an interrupt request and the execution of a return-from-interrupt service routine instruction. The initial value, where no interrupt request has occurred, is assumed to be expressed in terms of 00, and if interrupt requests occurred as shown in FIG. 4, the value will change as 00—11—01—10—01—10—00. In case more than two interrupt requests of different levels are acknowledged, the state may assume one of 11 and 10, and in such a state, if one or more return instructions is executed, the state turns to either 00 or 10 to provide an unused register-set.

Figure 7:
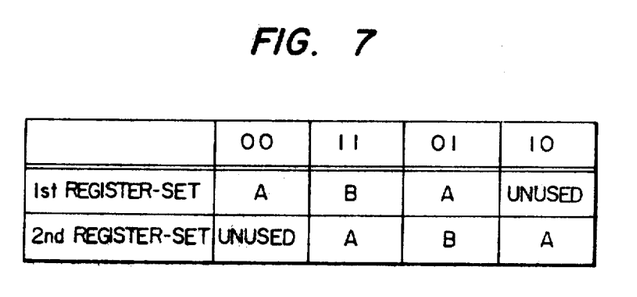
FIG. 7 is a schematic diagram useful for understanding the operation of the circuit of FIG. 5.

FIG. 7 is a table showing the state of assignment of the first and second register-sets 51 and 52 of FIG. 5 for respective states illustrated in FIG. 6. In FIG. 7, a reference A represents the register-set A, namely, the register-set at the top of the stack of the register-sets, and a reference B represents the register-set B, namely, the register-set positioned just below the top register-set. The fact that one of the register-sets 51 and 52 is in the unused state means that the other register-set is not functioning as an element of a stack and the region 36 of the main memory 33 (see FIG. 3) follows the top register-set 51 or 52 which is enabled.

Here, it should be noted that the word, stack of register-sets in the second embodiment of FIG. 5 is used in a different sense from the stack of register-sets in the first embodiment of FIG. 3. Namely, in the first embodiment, at least two register-sets are piled up to constitute a stack so that data are either pushed down or popped up in the stack. However, in the second embodiment, each register-set is independent, and any one of the register-sets may be used as the top register-set. In other words, the register-sets in the second embodiment are arranged in a predetermined order to form a loop where only one of the register-sets can be enabled at one time. The register-sets are enabled one after another in the predetermined order so that the register-sets function as a "stack" even though actual transfer of data therebetween is not performed. Such a stack in the second embodiment will be referred to as a quasi stack.

Although in the above-described embodiments, it has been imagined that the CPU is provided with two register-sets, the number of such register sets may be more than two when adapting the method according to the present invention. In case multi interrupt requests are expected, it is preferable to employ a CPU having a greater number of register-sets since improvement in the processing speed in the CPU is expected because savings in the contents of the register sets in the main memory tends to decrease as the number of the register sets increases.

Figure 8:
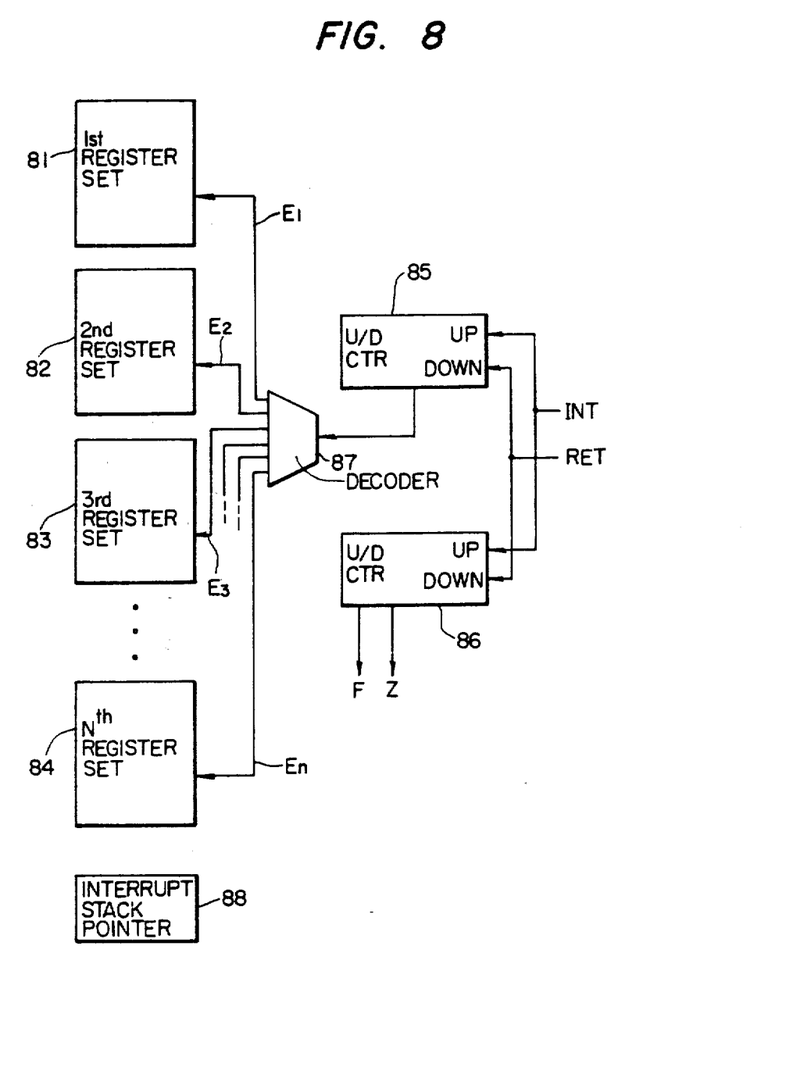
FIG. 8 is a schematic block diagram useful for understanding adaptation of the method according to the present invention to a system having more than two register sets.

Hence, reference is now made to FIG. 8 which shows a third embodiment of the present invention. The system of the third embodiment comprises N register sets included in the CPU (N represents a positive integer). Reference numerals 81, 82, 83 respectively represent first, second and third register-sets, and 84 represents an $N^{th}$ register set. A pair of divide-by-N up/down counters 85 and 86 are provided for receiving an interrupt request signal INT and a signal RET which are the same as in the second embodiment. In detail, each of the up/down counters 85 and 86 has an up-control terminal responsive to the interrupt request signal INT and a down-control terminal responsive to the signal RET indicative of the completion of a return instruction. The first up/down counter 85 has an output connected to a decoder 87 having a plurality of outputs the number of which equals N. The output signals of the decoder 87 are respectively designated at E1, E2, E3 . . . En, and the logic level of one of these output signals E1 to En becomes "1" in accordance with the value of the output signal, i.e. the count, of the first up/down counter 85. These outputs E1 to En are respectively connected to the register-sets 81 to 84. The interrupt request signal INT becomes logic "1" when an interrupt request occurrs, and the signal RET becomes logic "1" when a return-from-interrupt service routine instruction has been executed. The count of each of the first and second up/down counters 85 and 86 increases by one in receipt of a logic "1" of the interrupt request signal INT. On the contrary, the same count decreases by one in receipt of a logic "1" of the signal RET. However, there is an exception as follows: Namely, when the count of the second up/down counter 86 has already reached N, the count does not increase further even though the signal INT becomes logic "1". In the same manner, when the count of the second up/down counter 86 is zero, the count does not decrease below zero even though the signal RET becomes logic "1". The second up/down counter 86 has two output terminals for delivering two output signals F and Z. The first output signal F becomes logic "1" when the count of the second counter 86 equals N, while the signal Z becomes logic "1" when the count of the same equals zero. A reference numeral 88 represents an interrupt stack pointer for holding an address of a saving region of the main memory 33, in which the contents of the register-set which has the oldest data are saved upon receipt of an interrupt request under the condition that there are no unused register-set. In the system such as shown in FIG. 8, the specific number of an enabled register-set, which functions as the top register-set in the above-mentioned quasi stack, is designated by the output signal of the divide-by-N counter 85. The first output signal F of the second up/down counter 86 indicates whether all of the register-sets 81 to 84 except for one, which is enabled, are in the hold state or not, and the second output signal Z of the same indicates whether all of the register-sets 81 to 84 execpt for one, which is enabled, are in the unused state or not. In other words, these two output signals F and Z of the second up/down counter 86 indicate the loading state of the register-sets 81 to 84. When an interrupt request has been acknowledged while the signal F is of logic "1", the contents of the enabled register-set, which has been holding the oldest contents, are saved in the main memory 33 in accordance with the address indicated by the interrupt stack pointer 88. The contents of the interrupt stack pointer 88 is increased as many as the number of words which have been saved. When a return-from-interrupt service routine instruction has been executed while the signal Z is of logic "1", the saved data can be retrieved from the main memory 33 in accordance with the content of the interrupt stack pointer 88. When the signal INT or RET becomes logic "1" while both of the signals F and Z are of logic "0", only switching among register-sets 81 to 84 is performed.

As described in the above, the method according to the present invention in which a plurality of registers included in the CPU are electrically divided into a plurality of register-sets to be used as a last-in, first-out stack of register-sets, has the following effects:

(1) The number of transfers of data between the CPU and the main memory, which are essential in the conventional system and method upon occurrence of interrupt requests and on return from interrupt service routines, is reduced so that high-speed interrupt processings are actualized.

(2) Registers having the same construction may be used for the program status word registers and the general-purpose registers when adopting a microprogramming method. This is advantageous when actualizing a CPU on an integrated circuit because of the increase in the amount of area on the CPU having a repetitive pattern.

(3) It is merely required to provide register-sets inside the CPU as many as possible, and the number of interrupt priority levels is not restricted by the number of the register-sets.

(4) It is easy to maintain the interchangeability between systems having different numbers of register-sets built in respective CPUs.

It will be noticed that the number of the general-purpose registers included in one register-set, as well as the number and type of the program status word registers may be any numbers or types. The above-described embodiments of the present invention are just examples, and therefore, it will be apparent for those skilled in the art that many modifications and variations may be made without departing from the spirit of the present invention.

What is claimed is:

1. A method of processing program interrupts in a computer system having a central processing unit with a plurality of registers, and a main memory with a plurality of addresses, said registers being electrically divided into a plurality of register-sets so as to form a quasi stack of register-sets in which any one of said register sets may be used as the top register-set in said quasi stack, said register-sets in said quasi stack being arranged in a predetermined order to form a loop of register-sets, said main memory storing a program of a main routine and a plurality of programs of interrupt service routines having different priority levels, a first register-set in said quasi stack being normally enabled for the execution of said program of said main routine, said method comprising the steps of:
    (a) enabling said first register-set for executing the program of said main routine;
    (b) enabling another one of said register-sets as said top register-set in said predetermined order each time a first interrupt request or an interrupt request having a priority level higher than that of the interrupt service routine on execution is acknowledged for executing a corresponding interrupt service routine by the enabled register-set one after another;
    (c) enabling another one of said register-sets as said top register-set in an order reverse to said predetermined order each time said corresponding interrupt service routine has been completed for completing suspended interrupt service routine or routines of lower priority levels, if any, one after another; and
    (d) resuming the execution of the program of said main routine by enabling said first register set after all of the interrupt requests are processed.

2. A method of processing program interrupts in a computer system as claimed in claim 1, wherein said main memory has a saving region for saving data stored in at least one of said register-sets, said method further comprising the steps of:
    (a) saving, in said saving region of said memory, in said predetermined order, the contents of one of said register sets, in which the oldest data among said register-sets are stored, if all of said register-sets have been loaded, each time an interrupt request having a priority level higher than that of the interrupt service routine on execution is acknowledged for executing a corresponding interrupt service routine by the enabled register-set one after another; and
    (b) retrieving the saved data by transferring the same from said saving region of said main memory to one of said register-sets, which is enabled, for further completing the suspended interrupt service routine or routines of lower priority levels one after another.

* * * * *